United States Patent [19]

Esch

[11] Patent Number: 5,226,373
[45] Date of Patent: Jul. 13, 1993

[54] PALLET, ESPECIALLY FLAT POOL PALLET

[75] Inventor: Guenter Esch, Grainau, Fed. Rep. of Germany

[73] Assignee: Firma Kornitol International GmbH, Fed. Rep. of Germany

[21] Appl. No.: 596,935

[22] Filed: Oct. 15, 1990

[30] Foreign Application Priority Data

Oct. 17, 1989 [DE] Fed. Rep. of Germany ....... 3934561

[51] Int. Cl.⁵ .............................................. B65D 19/00
[52] U.S. Cl. .................................. 108/51.1; 108/901; 248/346
[58] Field of Search ............... 108/51.1, 901; 248/346; 105/375; 52/DIG. 9, 799, 800; 428/595, 465, 466

[56] References Cited

U.S. PATENT DOCUMENTS

| | | | |
|---|---|---|---|
| 1,761,848 | 6/1930 | Sitzman et al. | 52/576 X |
| 3,713,620 | 1/1973 | Tkach | 248/346 X |
| 3,814,778 | 6/1974 | Hosoda et al. | 108/51.1 X |
| 3,880,092 | 4/1975 | Seeber et al. | 108/51.1 |
| 4,385,564 | 5/1983 | Heggenstaller | 108/901 X |
| 4,397,246 | 8/1983 | Ishida et al. | 248/346 X |
| 4,397,247 | 8/1983 | Lemelson | 108/901 X |
| 4,435,477 | 3/1984 | Davis | 428/465 X |
| 4,966,083 | 10/1990 | Cerugeira | 108/901 X |
| 5,042,397 | 8/1991 | Fiedler | 108/901 X |

FOREIGN PATENT DOCUMENTS 1168418 10/1969 United Kingdom ............... 108/51.1

Primary Examiner—Peter A. Aschenbrenner
Attorney, Agent, or Firm—Beveridge, DeGrandi, Weilacher & Young

[57] ABSTRACT

The invention is relative to a pallet whose covering strips and optional bottom strips (3) consist of a carrier part and of a coating. The carrier part can be e.g. a hollow profile consisting of metal which is surrounded on all sides by rubber, preferably obtained from old motor vehicle tires, in order to form a jacketing. This makes it possible to replace the expensive wooden material which is otherwise used in known pallets with preferably economical waste products.

16 Claims, 2 Drawing Sheets

PALLET, ESPECIALLY FLAT POOL PALLET

The invention is relative to a pallet, especially a flat pool pallet, according to the generic part of claim 1.

The term "flat pool pallets" denotes pallets for the conveyance of freight which are organized in Europe in a pool monitored by the European railways. This Europallet is manufactured to standard from wood in an 8×1,200 format according to memorandum UIC 435-2 and is moved in a circulation-exchange system.

These pool pallets are subject to considerable wear due to constant exchange and must be replaced on a regular basis in spite of a basic ability to be repaired. Since these pallets consist of wood, which is too expensive a material for such an application considering the environmental problems which have developed in the interim in forests throughout most of the world, enormous amounts of wood must be used, which for its part considerably intensifies the already-existing problems in forests.

The present invention therefore as the problem of creating a flat pool pallet which can be manufactured in a more advantageous manner with retention of the same dimensions and the same load capacity and whose service life is considerably improved.

It is possible in this manner to at first replace wood as the material by means of a carrier part and a suitable coating which form a composite together which is wood-free and which is nevertheless not inferior as regards its performance to covering strips and especially to bottom strips consisting of wood. Furthermore, since the pallet of the invention can exhibit the same constructional dimensions and can also be designed optically almost like the customary pallets previously used, the pallet of the invention can be used in parallel with the existing wooden pallets, which should encourage a successive replacement of the wooden pallets.

Other advantages include the fact that a service life of up to 10 times greater (measured by the circulation in the pool) can be achieved by means of a suitable selection of material. It is also possible to lower the danger of breakage by means of using elastic materials, which also makes it possible to lower the danger of injury as an additional advantage since injuries caused by wooden splinters on unplaned wood frequently occur when wooden pallets are used.

It is furthermore possible to reduce the combustibility of the pallet of the invention in relation to wooden pallets.

The subclaims contain advantageous further developments of the invention.

Almost any kind of hollow profile can be used as carrier part. Round, rectangular or square hollow profiles constitute especially preferred embodiments but any other form is also basically suitable.

The additional arrangement of recesses can improve the strength of the composite between carrier part and coating.

The skeleton formed by the carrier part can consist of any type of metal. Especially preferred materials are steel, aluminum or light-metal alloys. Other conceivable materials are glass fibers or any type of synthetic materials such as thermoplastic or duroplastic substances as well as pressed materials consisting of synthetic or natural materials as well as, finally, also agglomerates or conglomerates of such materials or of similar materials.

It is also conceivable as an alternative to the above-mentioned hollow profiles to provide a skeleton of flat profiles or of a combination of flat profiles and hollow profiles, in which instance the same materials as were mentioned above can basically also be used. Especially preferred conceivable flat profiles are designed as corrugated profiles and/or stamped, perforated metal sheets. Finally, interwoven constructions consisting of the above-named materials are also conceivable.

In an especially preferred embodiment the coating is designed as a jacketing which surrounds the carrier part on all sides.

It is preferable to use a waste material as material for the coating or jacketing, in which instance a twofold environmental advantage is achieved since on the one hand the valuable material wood is no longer required and on the other hand materials can be reused which would otherwise harm the environment and entail high disposal costs.

From this point of view, gum or rubber obtained from old motor vehicle tires is an especially preferred material. When this material is used, the casing can take place by means of vulcanization or lamination or by similar methods with the advantage that old tires and rubber-industry waste is available at almost no cost. The rubber material obtained in this manner from waste material can be processed either molten or pulverized and by means of suitable additives to a rubber mass which can then be applied onto the carrier skeleton or pressed in forms.

If the pallet of the invention is manufactured in this manner, the special advantage also results that the weight is approximately 20% lower in comparison to a wooden pallet, since the weight of the wooden pallets can frequently be considerably increased by means of a relatively high degree of moisture. On the other hand, the base materials of the pallets of the invention absorb practically no water, so that considerable advantages as regards weight can be achieved.

In addition, the advantage results that the pallet of the invention is completely recyclable since, particularly when rubber is used, all parts consisting of this material can be completely reused again by means of suitable methods and the carrier constructions can likewise be reused by means of being melted down, provided that meltable materials are used for them.

In addition thereto, a very long service life results, as has already been mentioned and the pallet of the invention is capable of being repaired.

Moreover, the pallet of the invention can be centrally manufactured in any country in which it is needed and assembled in the main regional final assembly plants, which makes possible great savings of freight volume since the previously known wooden pallet had to be loaded in a completely assembled state. Thus, only 700 wooden plates on the average were able to be loaded on a truck in the past, in contrast to which at least 1,400 pallets in accordance with the invention in the form of individual parts can be loaded as regards the volume, since the assembly can be carried out in a decentralized manner.

This results in considerable savings in transport and manufacture.

Adhesion, screwing and riveting can be emphasized as especially preferred types of assembly for the covers and any bottom strips to the cross frames of the pallets of the invention. The first assembly type is the most economical and the most reliable method.

Other details, features and advantages of the invention result from the following description of examples of embodiments with reference made to the drawings.

The basic design of a pallet in accordance with the invention, which is not shown in its entirety in the figures, comprises covering strips upon which the freight is placed and which exhibit the form of elongated, essentially rectangular boards. However, considering the fact that the covering strips of the pallet of the invention do not consist of wood, the expression "covering board" which is otherwise customary in the case of wooden pallets is replaced by the expression "covering strip".

Figure 5:
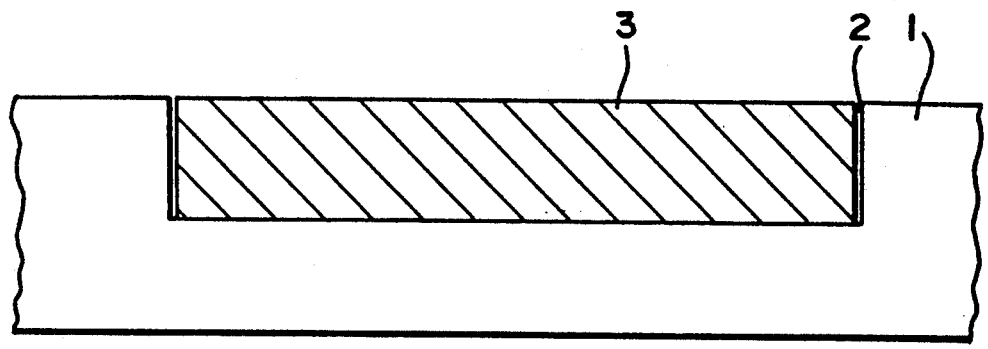
FIG. 5 shows a cross section through a cross frame of the pallet in accordance with the invention with a covering strip mounted in it.
Figure 6:
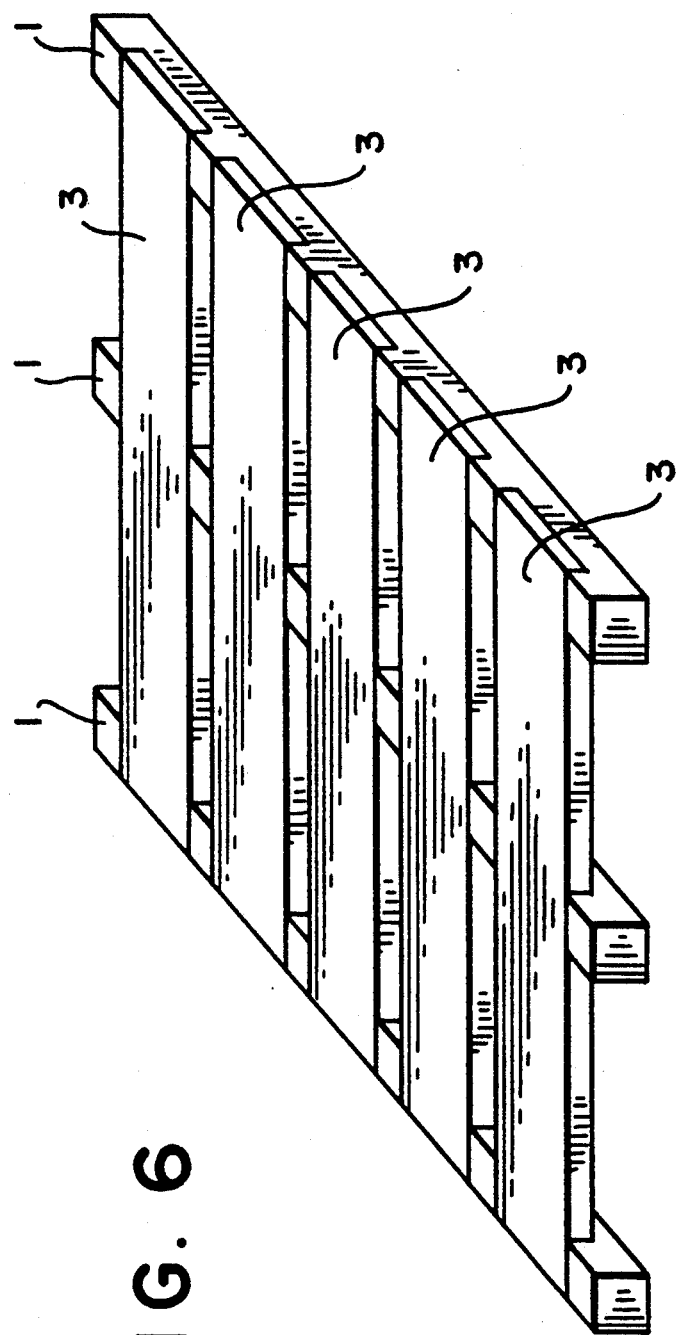

The covering strips, arranged adjacent to each other in a plane, are carried by cross frames of which cross frame 1 is shown in FIG. 5. Cross frame 1 can be designed as a rectangular profile and a pressed part. Basically, a design as composite with a carrier part and a jacketing is also conceivable. The preferred embodiment of cross frame 1 shown in FIG. 5 comprises a recess 2 in which a covering strip 3 is located. The provision of recess 2 in covering frame 1 results in an increase of stability. However, it is also basically possible to mount covering strip 3 on cross frame 1, that is, without recess 2. Adhesion, screwing or rivet connections are suitable for fastening covering strip 3 to cross frame 1.

The pallet of the invention normally comprises a plurality of cross frames, especially three cross frames arranged adjacent to each other and extending vertically to the longitudinal elongation of the cover strips. The cross frames can be connected to each other on their side facing away from the covering strip via a bottom strip extending parallel to the covering strips.

Possible covering-strip constructions are shown in FIGS. 1-4.

Figure 1:
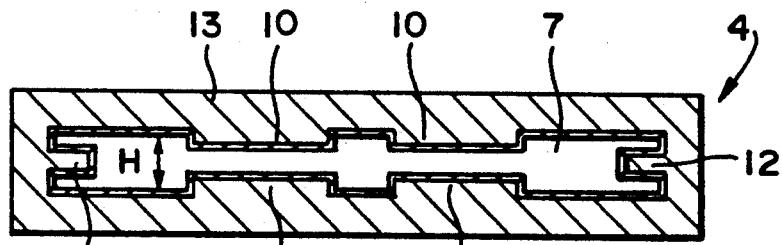
FIGS. 1-4 show cross sections through covering strips of a pallet in accordance with the invention.
Figure 2:
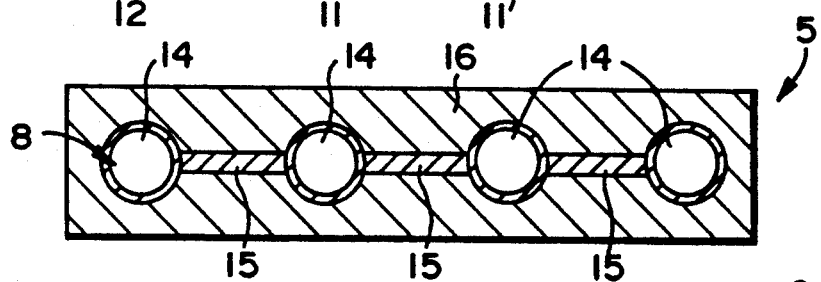
Figure 3:
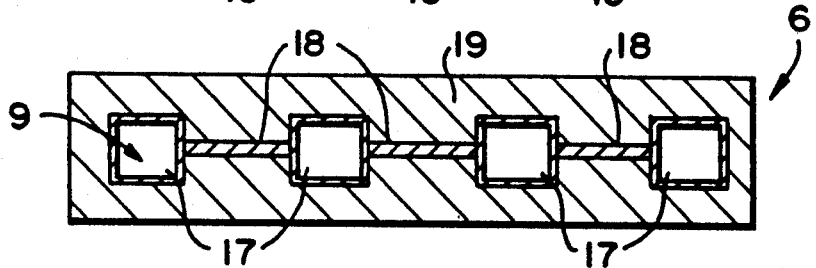

The embodiments according to FIGS. 1-3 concern covering strips 4,5 and 6 which comprise a rectangular, round or square hollow profile 7,8 and 9 as carrier part.

In FIG. 1, hollow profile 7 is a rectangular hollow profile which comprises a plurality of recesses 10,11 and 12 on the flat sides and the frontal sides in this example and which is completely surrounded by a coating in the form of jacketing 13 on all sides. The total height of this arrangement corresponds to the standard dimensions of Euro-pallets and is 22 mm. The hollow profile exhibits a height H of approximately 10 mm in the recess-free areas. The provision of the recesses or indentations results in the advantage that jacketing 13, which can be, for example, vulcanized-on rubber from old tires, has an especially reliable hold on carrier part 7.

The wall thickness of hollow profile 7 can vary from application to application and is dimensioned in particular in accordance with the loads to be expected.

Hollow profile 8 of the embodiment of FIG. 2 comprises a plurality of tubes 14 which are circular cylinders in this example and are connected to each other via cross carrier 15 in order to form hollow profile 8. A jacketing 16 is also provided in this embodiment which surrounds hollow profile 8 on all sides and can consist of the initially mentioned substances.

Finally, FIG. 3 shows a hollow profile which consists of a plurality of square tube sections 17 which are again connected to each other via cross carrier 18. A jacketing 19 on all sides is also provided in this instance as coating, which can likewise consist of the initially mentioned materials.

Figure 4:
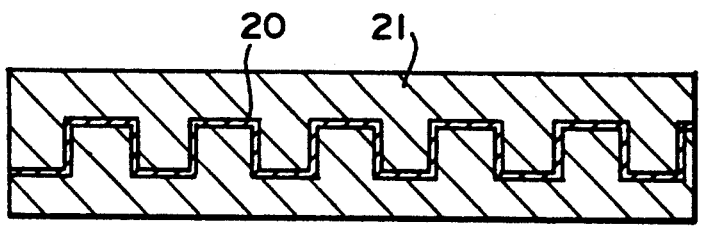

Finally, FIG. 4 shows an embodiment in which a flat, stamped profile 20 is provided which could also be designed to be corrugated or the like in an alternative embodiment. This profile 20 is also surrounded on all sides by a jacketing 21 consisting of rubber or of other elastic masses preferably produced from waste materials and forms covering strip 22.

The covering strips constructed in this manner can be connected to cross frame 1 in the previously described manner in order to form a pallet in accordance with the invention. Furthermore, the pallet can selectively comprise bottom strips which can be constructed just like the covering strips shown in FIGS. 1-4.

Alternatively, it is also possible in an embodiment which is not shown in the figures to provide a carrier part with a preferably elastic but load-bearing coating only on one side so that the carrier part is then fastened e.g. directly onto the cross frame.

In a further embodiment which is not shown in more detail, the coating or jacketing 13 or 19 can be provided in an advantageous manner with a surface structure or roughened. To this end, the rubber surface, for example, is provided with an anti-skid profile which is pressed, stamped or produced in any customary manner, e.g. with elevations, a rhombus pattern, nubs, etc. This makes possible an especially advantageous stabilization of the freight to be transported.

It should finally be mentioned that it is generally possible to construct the pallet of the invention is such a manner as the initially described flat pool pallets are constructed, that is, comprising beams, corner blocks and bottom boards (bottom strips).

It is also additonally possible to combine parts of the pallet, e.g. the covering strips, or the entire pallet of the invention with blocks of wood or of wood pulp, especially for the known pool pallets.

However, all these parts are constructed in the pallet according to the invention in the manner specified in the claims.

I claim:
1. A pallet comprising:
   a plurality of coplanar cover strips in the form of elongated essentially rectangular boards which extend in a longitudinal direction, and
   a plurality of cross frames which extend perpendicular to said cover strips and which releasably hold said cover strips,
   said cover strips being formed of a hollow reinforcing skeleton jacketed with an outer coating of rubber.
2. A pallet according to claim 1, wherein said skeleton is formed with recesses to hold said outer coating.
3. A pallet according to claim 1, wherein said skeleton is formed of plastic.
4. A pallet according to claim 1, wherein said skeleton is formed of metal.
5. A pallet according to claim 1, wherein said cover strips are releasably held in recesses in said cross frames.
6. A pallet according to claim 1, wherein said skeleton presents a rectangular profile along said vertical direction.
7. A pallet according to claim 6, wherein said skeleton presents a square profile along said vertical direction.

8. A pallet according to claim 1, wherein said skeleton presents a circular profile along said vertical direction.

9. A cover strip for a pallet, comprising:
a reinforcing skeleton jacketed on all sides with an outer coating of rubber to form an elongated essentially rectangular board, said reinforcing skeleton having a plurality of hollow portions connected by solid cross carriers.

10. A cover strip of a pallet in accordance with claim 9, wherein said solid cross carriers are thinner than said hollow portions so as to form recesses for receiving said outer coating of rubber.

11. A cover strip for a pallet in accordance with claim 9, wherein at least one of said hollow portions has a round profile.

12. A cover strip for a pallet in accordance with claim 9, wherein at least one of said hollow portions has a rectangular profile.

13. A cover strip for a pallet in accordance with claim 12, wherein at least one of said hollow portions has a square profile.

14. A cover strip for a pallet, comprising:
a hollow reinforcing skeleton jacketed on all sides with an outer coating of rubber to form an elongated essentially rectangular board, said reinforcing skeleton having a plurality of recesses for receiving said rubber.

15. A cover strip for a pallet in accordance with claim 14, wherein said reinforcing skeleton has a first end and a second end, each of said ends having a recess therein.

16. In a pallet formed of a plurality of cover strips in the form of cover strips releasably held by cross frames, the improvement comprising:
forming at least one of said cover strips of a hollow reinforcing skeleton jacketed on all sides with an outer coating of rubber to form an essentially rectangular board, said reinforcing skeleton having a plurality of recesses for receiving said outer coating of rubber.

* * * * *